United States Patent
Appa

[19]

[11] Patent Number: 5,887,828
[45] Date of Patent: Mar. 30, 1999

[54] SEAMLESS MISSION ADAPTIVE CONTROL SURFACE

[75] Inventor: Kari Appa, Lake Forest, Calif.

[73] Assignee: Northrop Grumman Corporation, Los Angeles, Calif.

[21] Appl. No.: 969,826

[22] Filed: Nov. 13, 1997

[51] Int. Cl.⁶ ....................................................... B64C 9/18
[52] U.S. Cl. .......................... 244/215; 244/219; 244/90 R
[58] Field of Search ................................... 244/213, 214, 244/215, 219, 90 R, 75 R, 13 U

[56] References Cited

U.S. PATENT DOCUMENTS

| | | | |
|---|---|---|---|
| 1,344,244 | 6/1920 | Patterson | 244/219 |
| 1,493,522 | 5/1924 | Crowell et al. | 244/219 |
| 1,790,309 | 1/1931 | Kientz | 244/219 |
| 3,179,357 | 4/1965 | Lyon | 244/219 |
| 3,698,668 | 10/1972 | Cole | 244/219 |
| 3,930,626 | 1/1976 | Croswell, Jr. et al. | 244/44 |
| 4,247,066 | 1/1981 | Frost et al. | 244/219 |
| 4,667,898 | 5/1987 | Greenhalgh | 244/46 |
| 5,082,207 | 1/1992 | Tulinius | 244/76 R |
| 5,150,864 | 9/1992 | Roglin et al. | 244/219 |
| 5,222,699 | 6/1993 | Albach et al. | 244/213 |
| 5,374,011 | 12/1994 | Lazarus et al. | 244/75 R |
| 5,531,407 | 7/1996 | Austin et al. | 244/219 |

*Primary Examiner*—Galen L. Barefoot
*Attorney, Agent, or Firm*—Terry J. Anderson; Karl J. Hoch, Jr.

[57] ABSTRACT

An airfoil is provided with a seamless control surface which comprises upper and lower skins fixed to a spanwise extending spar and extending chordwise to a trailing edge and having an outer surface which is substantially a continuation of the upper and lower surfaces of the airfoil. A joint mechanism proximately attaches together the bailing edges of the upper and lower skins while permitting relative chordwise movement therebetween. Actuating devices are operable for selectively altering the curvature of the upper and lower skins to cause deflection of the seamless control surface between an extreme raised position through a neutral position to an extreme lowered position. In this manner, the outer surface curvature of the airfoil and of the seamless control surface is smooth and continuous over substantially the entirety thereof at all positions of the seamless control surface. The actuating devices may be hydraulic, pneumatic, or solid state and the upper and lower skins may be of composite material.

11 Claims, 1 Drawing Sheet

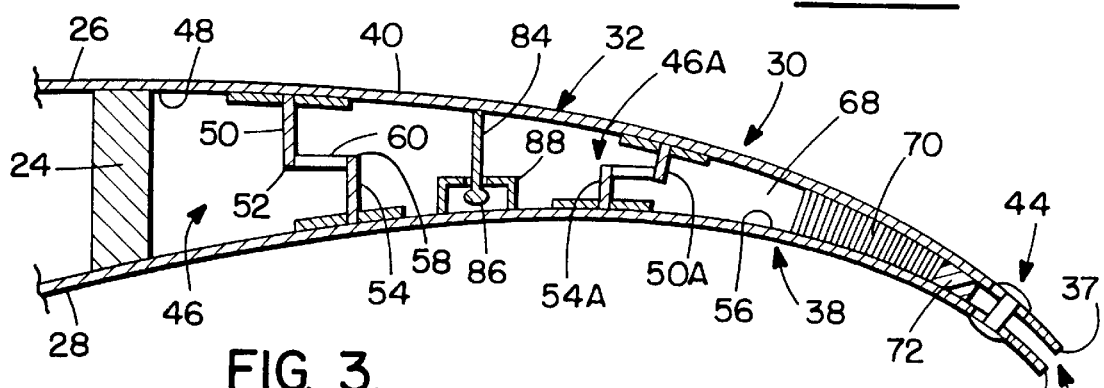
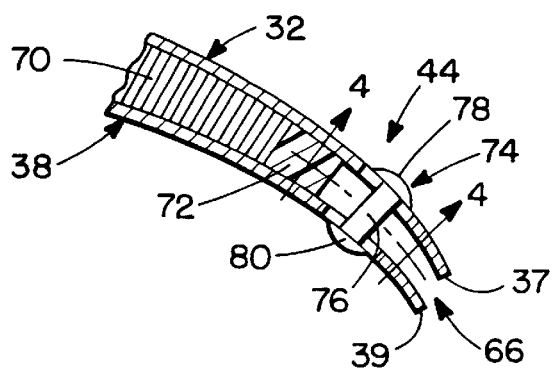
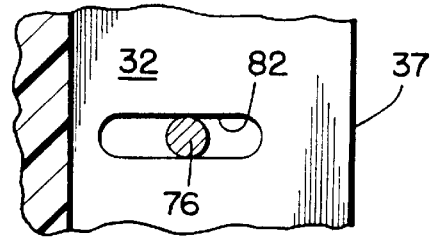
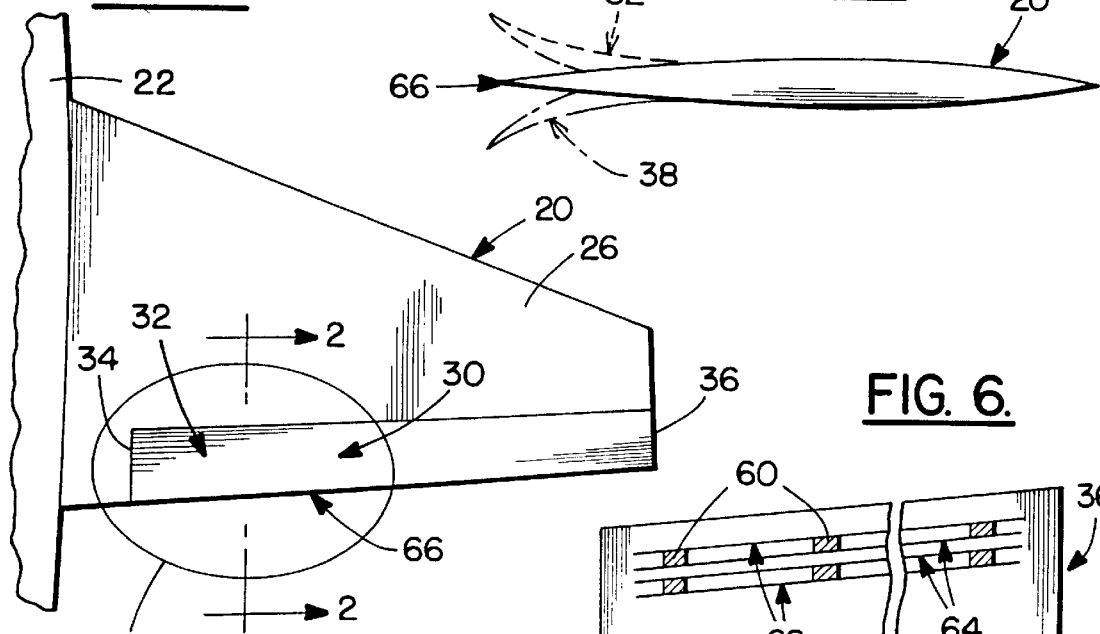
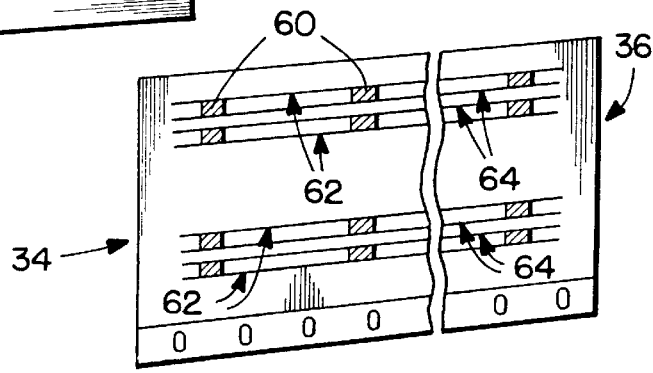

SEAMLESS MISSION ADAPTIVE CONTROL SURFACE

The U.S. Government has a paid-up license in this invention and the right in limited circumstances to require the patent owner to license others on reasonable terms as provided by the terms of Contract No. F333675-D-3215-006 awarded by the United States Air Force.

BACKGROUND OF THE INVENTION

1. Field of the Invention

The present invention relates generally to aircraft control surfaces and, more particularly, to a seamless control surface for an airfoil so constructed that the outer surface curvature of the airfoil and of the seamless control surface is smooth and continuous over substantially the entirety thereof at all positions of the seamless control surface.

2. Description of the Prior Art

Conventional control surfaces are attached to the wing by hinges and typically operated by hydraulic or pneumatic actuators. When flaps are deployed, there exists a discontinuity in slope resulting in flow separation. The following disadvantages are observable with respect to conventional flaps:

- hinged control surfaces drastically reduce aerodynamic efficiency of the control surfaces due to flow separation along the hinge line;
- edge or tip vortices reduce lift;
- hydraulic actuators are heavy and their frequency response characteristics are low. Because of this, hydraulic actuated control surfaces encounter 'buzz' in transonic flight regimes and have a reduced flutter speed;
- control surface stiffness must be increased to increase aeroelastic stability characteristics; this increases net weight of the control actuator system (including weight of the hydraulic or pneumatic actuator) as well as the net weight of the vehicle;
- agility of the aircraft is limited due to reduced aerodynamic effectiveness of the hinged control surface; and
- limited applicability of the active flutter suppression algorithm due to the slow response of hydraulic and pneumatic systems.

A number of patents disclosing typical inventions pertinent to the present invention will now be presented. For instance, in U.S. Pat. No. 5,531,407 to Austin et al., a plurality of translational actuators capable of extending and contracting are used to control the shape of a structure having one or more surfaces by means of a plurality of internal actuators. The shapes of the surfaces are controlled by computing the actuator strokes or loads required for achieving specified surface deflections. Two disclosed methods accomplish this control. In the actuator stroke-control method the surface deflections or deflection errors for closed-loop control are multiplied by a stroke-control gain matrix which is a function of the properties of the structure with the actuators absent. In the actuator load-control method, the surface deflections or deflection errors for closed-loop control are multiplied by a load-control gain matrix which is a function of the properties of the structure with the actuators absent. The control gain matrices minimize the surface shape errors. Ratios of stresses to allowable values are continuously monitored throughout the structure and corrective action is taken to prevent an overstressed condition. Unfortunately, in actuality, a desired airfoil shape cannot be derived by pushing and pulling the surfaces. Moreover, an excessive amount of power would be required to change the shape of a wing structure which is designed to carry heavy loads. In addition, there is no point in changing the wing shape in the center section since it would be aerodynamically undesirable. Leading and trailing edges are the optimum regions for making adjustments; they are the easiest to shape in order to achieve aerodynamic advantages and are also the most cost effective.

U.S. Pat. No. 5,374,011 to Lazanis et al. discloses an adaptive sheet structure with distributed strain actuators which is controlled by a dynamic compensator that implements multiple input, multiple output control laws derived by model-based control methodologies. An adaptive lifting surface is controlled for maneuver enhancement, flutter and vibration suppression and gust and load alleviation with piezoceramic elements located within, or enclosed by sheets of composite material at a particular height above the structure's neutral axis. Sensors detect the amplitudes of lower order structural modes, and distributed actuators drive or damp these and other modes. The controller is constricted from an experimental and theoretical model using conventional control software, with a number of event recognition patterns and control algorithms programmed for regulating the surface to avoid instabilities. The number of control states of the compensator is then reduced by removing states having negligible effects on the plant, and a smaller set of control laws are optimized and then adjusted based on analytical models bench and wind-tunnel testing.

While the device of this patent may work well on test models, it is not practical for aircraft configurations. First, there is weight penalty, and secondly piezoceramic strains are very small such that the desired deformation cannot be achieved. Indeed, any actuator system which employs piezoelectric or terfenol concepts must be built with mechanical magnification factors in the order of 100 or more. There is no indication in the patent that this has been considered.

In U.S. Pat. No. 5,222,699 to Albach et al., the inventive concept is based on use of a warped airfoil shape to eliminate the gaps and abrupt changes that occur at the hinged area of a conventional control surface, and an elastomeric transition session to provide a smooth transition between the warped and undetected shapes of the fixed wing or tail surface sections. The warped shape of the control surface is achieved by mechanically shortening or lengthening either one of the surfaces (upper or lower) of the control surface while the other surface defects to the warp shape. Air loads are supported by the warped surface skins which act as a truss. In addition, the upper and lower skins are connected by elastomeric spars which provide a tension connection but very low shear connection between the skins. An aft facing seal is provided on the surface that is shortened or lengthened to prevent airflow into the airfoil interior area.

Although it is a thought provoking idea, its application to real aircraft would necessarily involve extensive manufacturing considerations and require a costly drive mechanism to achieve.

U.S. Pat. No. 5,150,864 to Roglin et al. discloses an airfoil camber control apparatus which utilizes a cable of shape memory alloy affixed at its ends to a front interior portion of the airfoil. A tensioning system is connected to a rear interior portion of the airfoil and to the cable. When electrical current is applied to the cable to heat it, it returns to its remembered, shorter length, thereby applying tension to the tensioning system to alter the position of the rear portion of the airfoil relative to the front portion.

While this concept may work well for slow shape changes, in that the rate of operation is limited by the heating and cooling cycle, it is inadequate, for flight maneuvers of high performance aircraft, failing to take into account aeroelastic considerations.

U.S. Pat. No. 5,082,207 to Tulinius discloses a system for controlling an aircraft by aeroelastic deflections of the wings which is effective beyond control surface reversal. The system includes flexible wings, leading and trailing edge control surfaces attached to the wings, sensors to measure selected aircraft flight parameters, an information processing system to receive and process pilot command signals and signals from the sensors, and control mechanisms in the wing that respond to processed signals from the information processing system. The control mechanisms selectively position the control surfaces to produce loads such that the wings are deflected in a desired manner for aircraft control. The system can be used for aircraft control (including maintaining stability), optimum cruise, and maneuver performance. Augmentation can be added for maneuver load control, gust load alleviation, and flutter suppression.

This invention utilizes modern active flight control technology in which a number of smaller conventional control surfaces are activated to redistribute the air load so that desired roll rate and flutter suppression can be achieved within the domain of flight envelope. However, the specific mechanisms utilized are not described.

U.S. Pat. No. 4,667,898 to Greenhalgh discloses a remotely piloted vehicle provided with single surface membranous airfoils controllable in flight. The airfoils are selectively deployed from a stowed position on either side within the fuselage by spars attached to the leading edges. Pivotal members attached to the root edges of the airfoils are positioned to regulate twist distribution, angle of attack, root camber ratio and root camber distribution.

This invention provides a deformable camber surface such as those used in handgliders and remotely piloted models and micro airplanes but is not reasonably applicable to conventional aircraft.

U.S. Pat. No. 4,247,066 to Frost et al. discloses an airfoil device and method providing smooth, continuous, variation in airfoil camber and surface curvature over substantially the entire length of the device by use of a trusslike bendable beam as an airfoil rib having the airfoil skin surfaces flexibly slidable relative thereto. The beam is divided chordwise into upper and lower beam members each formed of a plurality of articulated sections.

The beam members are connected by a bendable jackscrew which upon rotation causes one member to move chordwise, and its curvature to be changed, relative to the other thereby effecting deflection of the airfoil with concomitant variation in its camber and the curvatures of its outer skin surfaces.

This device appears to be heavy and cumbersome and requires a thicker airfoil to accommodate it. Moreover, because of the weight increase in the control surface area, it is susceptible to control surface flutter. Furthermore, the actuation rate of any mechanical device is slow hence these devices are not applicable to aeroservoelastic control which enhances the flutter speed margin.

U.S. Pat. No. 3,930,626 to Croswell, Jr. discloses a control surface provided with structural wires generally extending from the leading edge to the trailing edge on both the upper and lower surfaces, or closely adjacent thereto, so that upon selectively heating either the upper or lower wires, they will expand to a greater extent than the unheated wires on the opposite surface to warp or curve the surface generally over its entire extent from its leading edge to its trailing edge. With this structure, it is seen that the upper and lower surfaces will at all times be smooth and there will be no abrupt transition portions, and the general thickness of the wing may be maintained.

Although the concept is sound theoretically, it lacks practicality and has not been put into practice over the many years since it first appeared.

Performance characteristics of any aircraft are based on the quality and distribution of air flow on the lifting surfaces. By nature, birds are able to configure their wings in such a manner that the air flow quality is good and their flying efficiency is optimized. To simulate birds like flying characteristics the lifting surfaces must be able to deform smoothly at appropriate locations. In mid 1980s, Air Force sponsored a mission adaptive wing (MAW) project to study aerodynamic and maneuver performance characteristics of tactical aircraft. An F-111 aircraft was selected and fitted with hydraulic actuators to deform the wing. This aircraft was test flown for various mission performance evaluations. The test results showed overwhelming aerodynamic performance benefits and agility characteristics. However, the actuation system was heavy and expensive to operate, hence, practical implementation of this concept could not be realized at that time.

Recent wind tunnel studies sponsored by ARPA and Air Force show how smoothly contoured control surfaces promote incremental growth in suction pressure near the leading edge. This has beneficial effect on control surface effectiveness leading to enhanced aircraft maneuver performance.

Today with the advent of new materials technology, it is possible to design smoothly deforming lifting surfaces. Solid state actuators, in particular, are being developed which can output large forces at any desired rates. These can also be built in relatively small sizes and light weight. Since, these actuators are small and light, a large number of these actuators can be used on the lifting surface so that any desired lifting surface deformation shape can be commanded for any given flight mission maneuver.

It was with knowledge of the foregoing state of the technology that the present invention has been conceived and is now reduced to practice. The actuation and deployment concept embodied by this invention is different from all of the devices reviewed above. Furthermore, this system can easily be implemented in existing as well as in new aircraft without significant alterations in the design.

SUMMARY OF THE INVENTION

The present invention relates to an airfoil provided with a seamless control surface which comprises upper and lower skins fixed to a spanwise extending spar and extending chordwise to a trailing edge, extending spanwise to the wing tip, and having an outer surface which is substantially a continuation of the upper and lower surfaces of the airfoil. A joint mechanism proximately attaches together the trailing edges of the upper and lower skins while permitting relative chordwise movement therebetween. Actuating devices are operable for selectively altering the curvature of the upper and lower skins to cause deflection of the seamless control surface between an extreme raised position through a neutral position to an extreme lowered position. In this manner, the outer surface curvature of the airfoil and of the seamless control surface is smooth and continuous over substantially the entirety thereof at all positions of the seamless control surface. The actuating devices may be hydraulic, pneumatic, or solid state and the upper and lower skins may be of composite material.

The proposed concept employs reduced torsion stiffness characteristics of the control surface. This is achieved by disconnecting the upper and the lower surface at the trailing edge. The desired torsion stiffness is provided by low stiffness, shear core material. Since upper and lower skins act like plates, these can be deformed by small amount of bending moment applied at stringers. Hydraulic, pneumatic, or solid state actuators can be used either to pull or to push the stringers attached to the skins. The solid state actuators may be made, for example, of Terfenol-D manufactured by Etrema Products, Inc. of Ame, Iowa or of piezoelectric materials such as piezoelectric inchworm motors manufactured by Rockwell International Corporation of Thousand Oaks, Calif. Prime benefits of solid state actuators are; simplicity in design, light weight and rapid response, while hydraulic or pneumatic actuators are relatively heavy, need more room to install and have a relatively slow response.

In one approach for a seamless mission adaptive control surface according to the invention, upper and lower skins are made of composite material and spanwise stringers are attached or integrally manufactured portions of the upper and lower skins respectively. Piezoelectric inchworm actuators, for example, are attached to the upper and lower stringers as shown. These actuators exert force tinder electrical stimuli to either push the stringers apart or to pull the stringers together depending on whether upward or downward deployment of the control surface is required. As earlier noted, piezoelectric and Terfenol-D actuators possess unique advantages over hydraulic and pneumatic actuators such as rapid response, large force output from a relatively small package, the ability to be locked in position without consuming power, and perform with minimal moving parts.

The upper and lower skins are joined at their trailing edges by sliding rivets so that no shear flow is transmitted through the skin. To provide a small amount of torsional stiffness, a shear core material (either foam or honeycomb) may fill the control surface adjacent its trailing edge. Also, near the trailing edge, elastomer sealing material may be used to seal against air leaks and also acts as a damper in a dynamic environment Based on the preliminary analytical solutions, two actuators in the chord direction and three in the span direction are deemed sufficient to command any desired control surface contour (either simple curvature in the stream direction or warped surface in the chord-wise and span-wise directions) at any actuation rate. This kind of speed and flexibility does not exist in conventional hinged control surfaces.

The seamless mission adaptive control surface of the invention can be installed with minimal design changes on both new and existing aircraft and missiles. In this regard, new aircraft such as F-18 E/F, JSF and F-22 can benefit from the invention and upgrades on existing aircraft such as F-18 A/B, F-18 C/D, F-16, F-5, and T-38 can be performed. Additionally, upgrades and new control fins can be provided on guided missiles such AIM-9X or AMRAAM.

A primary feature, then, of the present invention is the provision of a seamless control surface for an airfoil so constructed that the outer surface curvature of the airfoil and of the seamless control surface is smooth and continuos over substantially the entirety thereof at all positions of the seamless control surface.

Another feature of the present invention is the provision of such a control surface which is capable of increasing aerodynamic effectiveness to enhance aircraft maneuver characteristics such as pitch rate, roll rate and rolling pullover.

Still another feature of the present invention is the provision of such a control surface which is capable of increasing control surface flutter speed and avoiding control surface buzz in transonic flight conditions.

Yet another feature of the present invention is the provision of such a control surface which is capable of increasing response characteristics of the control surfaces so that active flutter suppression can be implemented with greater reliability.

Still a further feature of the present invention is the provision of such a control surface which is capable of increasing the agility of the aircraft using control surfaces with high response characteristics.

Yet a further feature of the present invention is the provision of such a control surface which is capable of reducing net weight and complexity of the control actuator system by introducing solid state motors.

Still another feature of the present invention is the provision of such a control surface which is capable of enhancing the service life of F-18 twin tails by actively controlling the buffet response using fast actuating rudder control surfaces to generate aerodynamic damping to attenuate response amplitudes.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIG. 1 is a detail top plan view diagrammatically illustrating a portion of an aircraft embodying the invention;

FIG. 2 is a cross section view taken generally along line 2—2 in FIG. 1;

FIG. 3 is a detail cross section view illustrating in greater detail a portion of FIG. 2;

FIG. 4 is a detail cross section view taken generally along line 4—4 in FIG. 3;

FIG. 5 is a side elevation view diagrammatically depicting various positions of the seamless control surface of the invention; and FIG. 6 is detail section view of components which may be present, but are not illustrated, in FIG. 1.

DETAILED DESCRIPTION OF THE PREFERRED EMBODIMENTS

Turn now to the drawings and, initially, to FIG. 1 which generally illustrates an airfoil 20 in the form of a wing suitably attached to a fuselage 22 of an aircraft. The airfoil 20 is seen to extend in both a chordwise direction, that is, parallel to a longitudinal axis of the fuselage, and in a transverse, or spanwise, direction.

As seen in FIG. 2, the airfoil 20 includes a spanwise extending spar 24, an upper surface 26, a lower surface 28, and a seamless control surface 30. An upper skin 32 is fixed to the spar in any suitable manner and extends spanwise to opposed edges 34, 36 and chordwise to a trailing edge 37. Similarly, a lower skin 38 is fixed to the spar 24 extending spanwise to the opposed edges 34, 36 and chordwise to the trailing edge 39. The upper skin 32 has an outer surface 40 which is substantially a continuation of the upper surface 26 of the airfoil 20 and the lower skin 38 has an outer surface 42 which is substantially a continuation of the lower surface 28 of the airfoil. While the upper and lower skins 32, 38 may be fabricated of sheet metal, they are preferably fabricated of composite material in sheet form.

A joint mechanism 44 proximately attaches the trailing edges 37, 39 of the upper and lower skins 32, 38, respectively, while permitting relative chordwise movement between the upper and lower skins.

Viewing FIG. 2, an actuating mechanism 46 selectively alters the curvature of the upper skin 32 and of the lower skin 38 to cause deflection of the seamless control surface 30 between an extreme raised dashed line position (FIG. 5) through a neutral, solid-line position to an extreme dash-dot line lowered position. It will be appreciated that when this movement occurs, the outer surface curvature of the airfoil 20 and of the seamless control surface 30 is smooth and continuous over substantially the entire interface therebetween at all positions of the control surface.

With continued reference to FIG. 2, it is seen that the upper skin has an inner surface 48 facing the lower skin 38 and that the lower skin has an inner surface facing the upper skin 32. Now, consider the construction of the actuating mechanism 46. A spanwise extending upper stringer 50 integral with the inner surface 48 of the upper skin 32 is preferably double flanged for optimum attachment strength. The upper stringer 50 projects toward the lower skin 38 to a lower extremity 52. Similarly, a spanwise extending lower stringer 54 integral with an inner surface 56 of the lower skin 38 projects toward the upper skin 32 to an upper extremity 58 which is proximately spaced from the lower extremity 50 of the upper stringer 50. As with the upper stringer 50, the lower stringer 54 is preferably double flanged for optimum attachment strength.

An actuator 60, which is elongated, extends between the lower extremity 52 of the upper stringer 50 and the upper extremity 58 of the lower stringer 54. The actuator is fixed at its opposite ends, respectively, to the lower extremity of the upper stringer and to the upper extremity of the lower stringer and is operable, in one instance, to draw the upper and lower extremities together and thereby deflect said seamless control surface toward the extreme lowered position (dash-dot lines as seen in FIG. 5). The actuator is operable, in another instance, to move the upper and lower extremities apart and thereby deflect said seamless control surface toward the extreme raised position (dashed lines as seen in FIG. 5).

As seen in FIG. 2, a pair of mirror imaged stringers 50A and 52A are provided corresponding to the stringers 50 and 52 and chordwise spaced therefrom. The stringers 50A, 52A are constricted similarly to the stringers 50, 52 and together with an associated actuator 60 comprise an actuating mechanism 46A.

FIG. 6 illustrates still another embodiment of the invention in which a plurality of pairs of upper and lower stringers 62, 64 are provided at chordwise spaced locations and in which a plurality of the actuators 60 are provided at a plurality of spanwise spaced locations. Such a construction improves the rapid response capability of the control surface as well as the quality of the smooth continuous outer surface curvature of the airfoil when its operation is called for.

With particular attention to FIGS. 2 and 3, the trailing edge 37 of the upper skin 32 and the trailing edge 39 of the lower skin 38 together define a trailing edge 66 of the seamless control surface 30. Further, the airfoil spar 24, the upper skin 32, and the lower skin 38 together define an interior cavity 68 and shear core material 70 is provided to fill a region of the interior cavity proximate the trailing edge 66 for torsional stiffness. The shear core material 70 may be, for example, plastic foam or metal honeycomb. Additionally, an elastomeric seal 72 is preferably attached, respectively, to the upper skin 32 and to the lower skin 38 at the trailing edge 66 to seal against air flow in and out of the interior cavity 68 and, at the same time, to provide for vibration damping of the upper skin against the lower skin.

The joint mechanism 44 includes a rivet member 74 including a shank 76 and opposed enlarged first and second head members 78, 80, respectively. The first head member 78 is fixed to the lower skin 38 proximate the trailing edge 39 and the upper skin 32 has a chordwise extending elongated slot 82 therein adjacent the trailing edge 37. As seen in FIG. 6, a plurality of chordwise extending elongated slots 82 are preferably provided at a plurality of spanwise spaced locations. With this construction, upon operation of the actuating mechanisms 46, 46A, the upper skin 32 is able to move chordwise relative to the lower skin 38 thereby relieving shear flow between the lower skin and the upper skin.

While the actuators 60 may be hydraulic actuators or pneumatic actuators of conventional design, they may also be solid state actuators possessing unique and significant advantages over such conventional actuators. Such advantages include the ability to respond rapidly to an input requirement, to provide a large force output from a relatively small package, to be locked in position without consuming power, and a construction containing a minimal number of moving parts.

With continuing reference to FIG. 2, a spanwise extending center spar 84 is illustrated which is integral with the inner surface 48 of the upper skin 32 intermediate, chordwise, the spaced pair of upper and lower stringers collectively comprising, respectively, the actuating mechanisms 46, 46A. The center spar 84 projects toward the lower skin 38 to an enlarged lower end 86. A spanwise extending retainer member 88 is mounted on the inner surface 56 of the lower skin 38 for engageably receiving the enlarged lower end of the center spar for maintaining fixed the separation between said upper and lower skins and for preventing movement of the enlarged lower end in chordwise directions while permitting rotation of the enlarged lower end relative to the lower skin. With this construction, the upper and lower skins 32, 38 are relatively movable chordwise while the thickness or depth of the control surface 30 between the upper and lower skins is maintained constant.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. In combination with an airfoil extending in both a chordwise direction and in a transverse spanwise direction and including a spanwise extending spar, an upper surface, and a lower surface, a seamless control surface comprising:

an upper skin fixed to said spar extending spanwise and extending chordwise to a trailing edge and having an outer surface which is substantially a continuation of said upper surface of said airfoil;

a lower skin fixed to said spar extending spanwise and extending chordwise to a trailing edge and having an outer surface which is substantially a continuation of said lower surface of said airfoil;

joint means proximately attaching said trailing edge of said upper skin and said trailing edge of said lower skin while permitting relative chordwise movement therebetween; and actuating means for selectively altering the curvature of said upper skin and of said lower skin to cause deflection of said seamless control surface between an extreme raised position through a neutral position to an extreme lowered position;

whereby the outer surface curvature of said airfoil and said seamless control surface is smooth and continuous over substantially the entirety thereof at all positions of said seamless control surface.

2. A combination as set forth in claim 1 wherein said upper skin has an inner surface facing said lower skin;

wherein said lower skin has an inner surface facing said upper skin;

wherein said actuating means includes:
- a spanwise extending upper stringer integral with said inner surface of said upper skin and projecting toward said lower skin to a lower extremity;
- a spanwise extending lower stringer integral with said inner surface of said lower skin and projecting toward said upper skin to an upper extremity which is proximately spaced from said lower extremity of said upper stringer; and
- an actuator extending between and fixed at its opposite ends, respectively, to said lower extremity of said upper stringer and to said upper extremity of said lower stringer, said actuator being operable, in one instance, to draw said upper and lower extremities together and thereby deflect said seamless control surface toward the extreme lowered position, said actuator being operable, in another instance, to move said upper and lower extremities apart and thereby deflect said seamless control surface toward the extreme raised position.

3. A combination as set forth in claim 1 wherein a plurality of said actuators are provided at a plurality of spanwise spaced locations.

4. A combination as set forth in claim 1 wherein said trailing edge of said upper skin and said trailing edge of said lower skin together define a trailing edge of said seamless control surface; and wherein said airfoil spar, said upper skin, and said lower skin together define an interior cavity; and including:
- shear core material filling a region of the interior cavity proximate said trailing edge of said seamless control surface for torsional stiffness thereof.

5. A combination as set forth in claim 1 wherein said trailing edge of said upper skin and said trailing edge of said lower skin together define a trailing edge of said seamless control surface; and wherein said airfoil spar, said upper skin, and said lower skin together define an interior cavity; and including:
- an elastomeric seal attached, respectively, to said upper skin and to said lower skin at said trailing edge of said seamless control surface to seal against air flow in and out of the interior cavity and for vibration damping of said upper skin against said lower skin.

6. A combination as set forth in claim 1 wherein said upper skin has an inner surface facing said lower skin;

wherein said lower skin has an inner surface facing said upper skin;

wherein said actuating means includes:
- a pair of chordwise spaced spanwise extending upper stringers integral with said inner surface of said upper skin and projecting toward said lower skin to a lower extremity;
- a pair of chordwise spaced spanwise extending lower stringers integral with said inner surface of said lower skin and projecting toward said upper skin to an upper extremity which is proximately spaced from said lower extremity of said upper stringer;
- an actuator extending between and fixed at its opposite ends, respectively, to said lower extremity of said upper stringer and to said upper extremity of said lower stringer, said actuator being operable, in one instance, to draw said upper and lower extremities together and thereby deflect said seamless control surface toward the extreme lowered position, said actuator being operable, in another instance, to move said upper and lower extremities apart and thereby deflect said seamless control surface toward the extreme raised position;
- a spanwise extending center spar integral with said inner surface of said upper skin intermediate, chordwise, said spaced pair of upper and lower stringers and projecting toward said lower skin to an enlarged lower end; and
- spanwise extending retainer means mounted on said inner surface of said lower skin for engageably receiving said enlarged lower end of said center spar for maintaining fixed the separation between said upper and lower skins and for preventing movement of said enlarged lower end in chordwise directions while permitting rotation of said enlarged lower end relative to said lower skin.

7. A combination as set forth in claim 1 wherein said joint means includes:
- a rivet member including a shank and opposed enlarged first and second head members;
- said first head member being fixed to said lower skin proximate said trailing edge thereof;
- said upper skin having a chordwise extending elongated slot therein adjacent said trailing edge thereof;
- thereby relieving shear flow between said lower skin and said upper skin.

8. A combination as set forth in claim 1 wherein at least said upper skin and said lower skin is composed of composite material.

9. A combination as set forth in claim 1 wherein said actuating means includes an hydraulic actuator.

10. A combination as set forth in claim 1 wherein said actuating means includes a pneumatic actuator.

11. A combination as set forth in claim 1 wherein said actuating means includes a solid state actuator.

* * * * *